United States Patent
Groen et al.

(10) Patent No.: US 6,650,746 B1
(45) Date of Patent: Nov. 18, 2003

(54) URGENCY OF CALL INDICATION TO CALLED PARTY THROUGH DISTINCTIVE NOTIFICATION

(75) Inventors: Pieter Groen, Naarden (NL); Robert A. Williamson, Aurora (CA); Anne Grosman, Willowdale (CA)

(73) Assignee: Nortel Networks Limited, St. Laurent (CA)

(*) Notice: Subject to any disclaimer, the term of this patent is extended or adjusted under 35 U.S.C. 154(b) by 383 days.

(21) Appl. No.: 09/609,295

(22) Filed: Jun. 30, 2000

(51) Int. Cl.$^7$ .......................... H04M 1/57; H04M 3/00; H04M 3/42; H04M 3/436
(52) U.S. Cl. .............................. 379/207.16; 379/93.23; 379/142.06; 379/196; 379/246; 379/252; 379/373.02; 379/911
(58) Field of Search ................. 379/37, 93.23, 379/142.01, 142.06, 142.08, 188, 196, 197, 201.01, 207.15, 207.16, 245, 246, 252, 373.01, 373.02, 373.03, 373.04, 911

(56) References Cited

U.S. PATENT DOCUMENTS

| | | | |
|---|---|---|---|
| 4,277,649 A | * 7/1981 | Sheinbein | 379/197 |
| 5,034,947 A | 7/1991 | Epps | 370/268 |
| 5,166,972 A | * 11/1992 | Smith | 379/37 |
| 5,329,578 A | 7/1994 | Brennan et al. | 379/211.03 |
| 5,787,162 A | * 7/1998 | Javitt | 379/133 |
| 5,825,867 A | 10/1998 | Epler et al. | 379/215.01 |
| 5,835,573 A | 11/1998 | Dee et al. | 379/88.26 |
| 5,894,504 A | 4/1999 | Alfred et al. | 379/88.13 |
| 6,026,156 A | 2/2000 | Epler et al. | 379/215.01 |
| 6,031,899 A | * 2/2000 | Wu | 379/88.12 |
| 6,215,859 B1 | * 4/2001 | Hanson | 379/192 |
| 6,289,084 B1 | * 9/2001 | Bushnell | 379/37 |
| 6,370,233 B1 | * 4/2002 | Bennett et al. | 379/201.11 |
| 6,370,235 B1 | * 4/2002 | Heiner | 379/188 |
| 6,377,795 B1 | * 4/2002 | Bach et al. | 379/70 |
| 6,456,706 B1 | * 9/2002 | Blood et al. | 379/188 |

FOREIGN PATENT DOCUMENTS

| | | | |
|---|---|---|---|
| WO | WO 98/48607 | 11/1998 | 379/215.01 |
| WO | WO 98/53617 | 11/1998 | 379/215.01 |
| WO | WO 99/48263 | 9/1999 | 379/215.01 |

* cited by examiner

Primary Examiner—Harry S. Hong
(74) Attorney, Agent, or Firm—Kevin L. Smith

(57) ABSTRACT

An indication of urgency of a call is received from a caller. The urgency indication is communicated to the called party through a distinctive notification, such as distinctive ringing. The urgency indication may be obtained from a caller via a personal agent.

10 Claims, 4 Drawing Sheets

URGENCY OF CALL INDICATION TO CALLED PARTY THROUGH DISTINCTIVE NOTIFICATION

BACKGROUND OF INVENTION

This invention relates to indicating urgency of a call through a distinctive notification (e.g., distinctive ringing).

Many efforts have been made to provide a called party with more information about a call so that the called party can make a more informed decision as to whether to take the call. For example, a person may subscribe to a calling line identification (CLID) service such that, when a call rings through, the called party can view the number (and/or name) of the caller and thereby be better able to decide on whether or not to take the call. A person may also subscribe to a distinctive ring service. In this case, several destination numbers ("DN"s) are assigned to the person's line and a telephone terminating the line rings with a different ring pattern dependent upon which DN was dialled to reach the line. In this way, different potential callers may be given different DNs so that the called party will have additional information about the call prior to answering same. While these approaches give a called party additional information, they give no direct information regarding the urgency of a call. Call urgency would be useful information to the called party in deciding whether to take the call.

In U.S. Pat. No. 5,329,578 to Brennan, a person may subscribe to a personal communications service. In such case, when a caller dials a personal number ("PN") of the subscriber, the caller is connected through to an interactive software personal agent. The personal agent interacts with the caller to obtain information. One query the personal agent may make is as to the urgency of the call. The caller may indicate urgency through appropriate dual tone multi-frequency ("DTMF") entries. Thereafter, the personal agent may connect through to the called party and announce the identity of the caller and the urgency level indicated by the caller. While this allows the called party to make an informed decision as to whether to take the call, there may be situations where it is inconvenient for a subscriber to take a call from his or her personal agent.

Accordingly, a need exists for a convenient approach to deliver information to a called party regarding the urgency of a call.

SUMMARY OF INVENTION

The present invention receives an indication of urgency of a call from a caller and communicates urgency to the called party through a distinctive notification such as, for example, by distinctive ringing.

According to the present invention, there is provided a method of call handling, comprising: receiving an indication of urgency of a call for a called station; and responsive to said indication, where said called station is on hook, sending signals for generating a distinctive notification indicative of urgency.

According to another aspect of the invention, there is provided a method of call handling, comprising: receiving an indication of urgency of a call; and responsive to said indication, sending signals for generating a distinctive ring indicative of urgency.

According to a further aspect of the invention, there is provided a method of call handling, comprising: receiving from a calling station an indication of urgency of a call to a called station; and responsive to said indication, sending signals to said called station for generating a distinctive ring indicative of urgency.

According to a yet further aspect of the invention, there is provided a service node comprising: means for receiving an indication of urgency of a call for a called station; and means for, responsive to said indication, where said called station is on hook, sending signals for generating a distinctive notification indicative of urgency.

According to another aspect of the invention, there is provided a communications system comprising: means for receiving an indication of urgency of a call for a called station; and means for, responsive to said indication, where said called station is on hook, sending signals for generating a distinctive notification indicative of urgency.

According to a further aspect of the invention, there is provided a computer readable medium containing instructions which, when performed by a service node, cause the service node to: receive an indication of urgency of a call for a called station; and responsive to said indication, where said called station is on hook, send signals for generating a distinctive notification indicative of urgency.

According to a yet further aspect of the invention, there is provided a computer data signal embodied in a carrier wave comprising: a set of urgency level indicators for a call for a called station; and a distinctive notification corresponding to each urgency level indicator in said set of urgency level indicators.

According to another aspect of the invention, there is provided a database storing a set of urgency level indicators and, for each urgency level indicator, a unique distinctive ringing pattern.

Other aspects and features of the invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of the invention.

DETAILED DESCRIPTION

Figure 1:
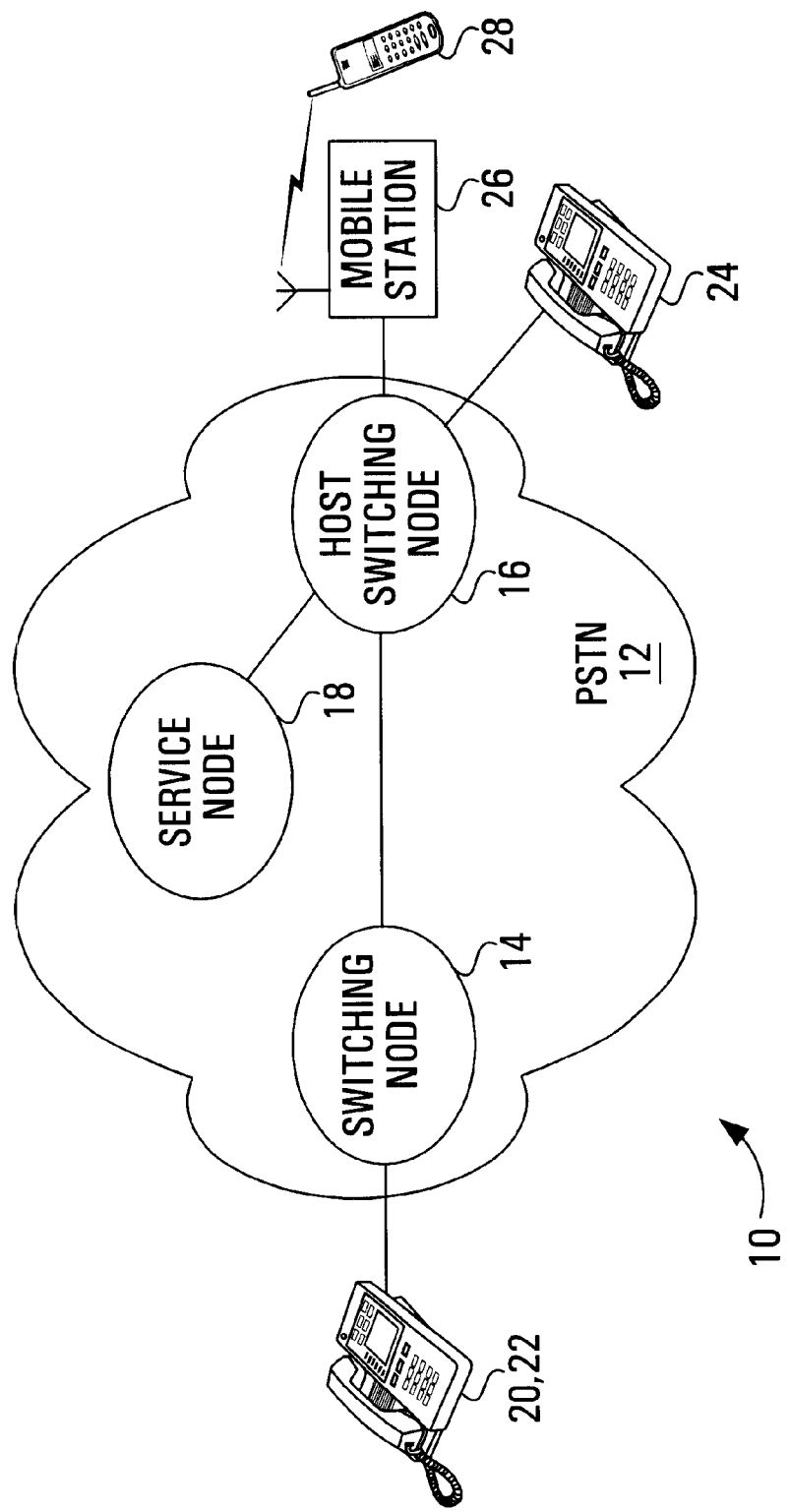
FIG. 1 is schematic illustration of a telecommunications system made in accordance with this invention.

Turning to FIG. 1, telecommunications system 10 comprises a public switched telephone network ("PSTN") 12 having a number of switching nodes 14, 16. Switching node 16 acts as a host node, being connected to service node 18. A number of telephone stations 20 connect to the PSTN including telephones 22, 24 and mobile station 26 with mobile phone 28.

With the advent of common channel signalling ("CCS"), a data channel, separate from the voice channel, is provided in a public switched telephone network ("PSTN"). This allows signalling between nodes in the PSTN and, consequently, the provision of advanced telecommunications features (such as CLID).

Figure 2:
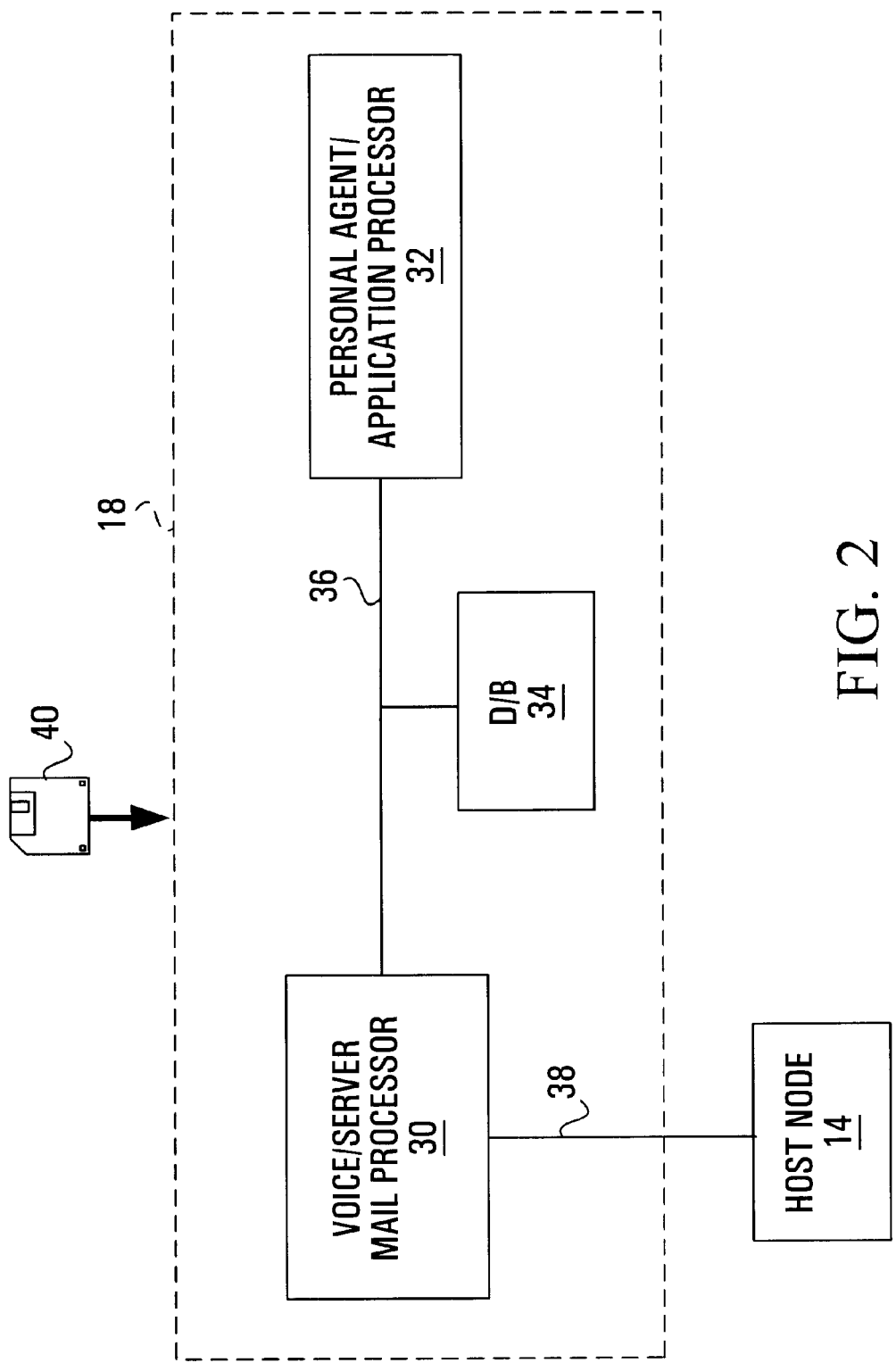
FIG. 2 is a detail schematic of a portion of FIG. 1.

Service node 18 is detailed in FIG. 2. Service node 18 has a voice/server mail processor 30, a personal agent/ application processor 32, and a database 34 interconnected on a bus 36. Host node 16 connects to service node 18 via line 38 to the voice server/mail processor 30. The voice/server mail processor may be a Meridian™ Mail Voice Processor sold by Nortel Networks Limited. The personal agent/application processor may be a Meridian™ Application Equipment Module sold by Nortel Networks Limited. The connection of the service node to the host node may be by way of an ISDN Primary Rate Access (PRA) or equivalent link able to carry voice and signalling information. The service node 18 is loaded with software from a computer readable medium 40 which is illustrated as a disk but could equally be a memory chip or a file downloaded from a source.

Database 34 stores a profile on each subscriber to the personal agent 32. The profile will include a destination number ("DN") for each telephone station associated with the subscriber's personal number ("PN"). Additionally, the profile may include such things as a schedule indicating the days and times for which each telephone station should be considered the primary telephone station, a list of calling numbers with associated special handling, and a voice mail DN.

A suitable system so far described is further detailed in U.S. Pat. No. 5,329,578, the contents of which are incorporated by reference herein.

A set of urgency level indicators and an associated distinctive ring pattern is stored either in each profile or in a separate common record. For example, an urgency level "1" may be associated with a first distinctive ring pattern, an urgency level "2" with a second pattern, and so on.

Figure 3:
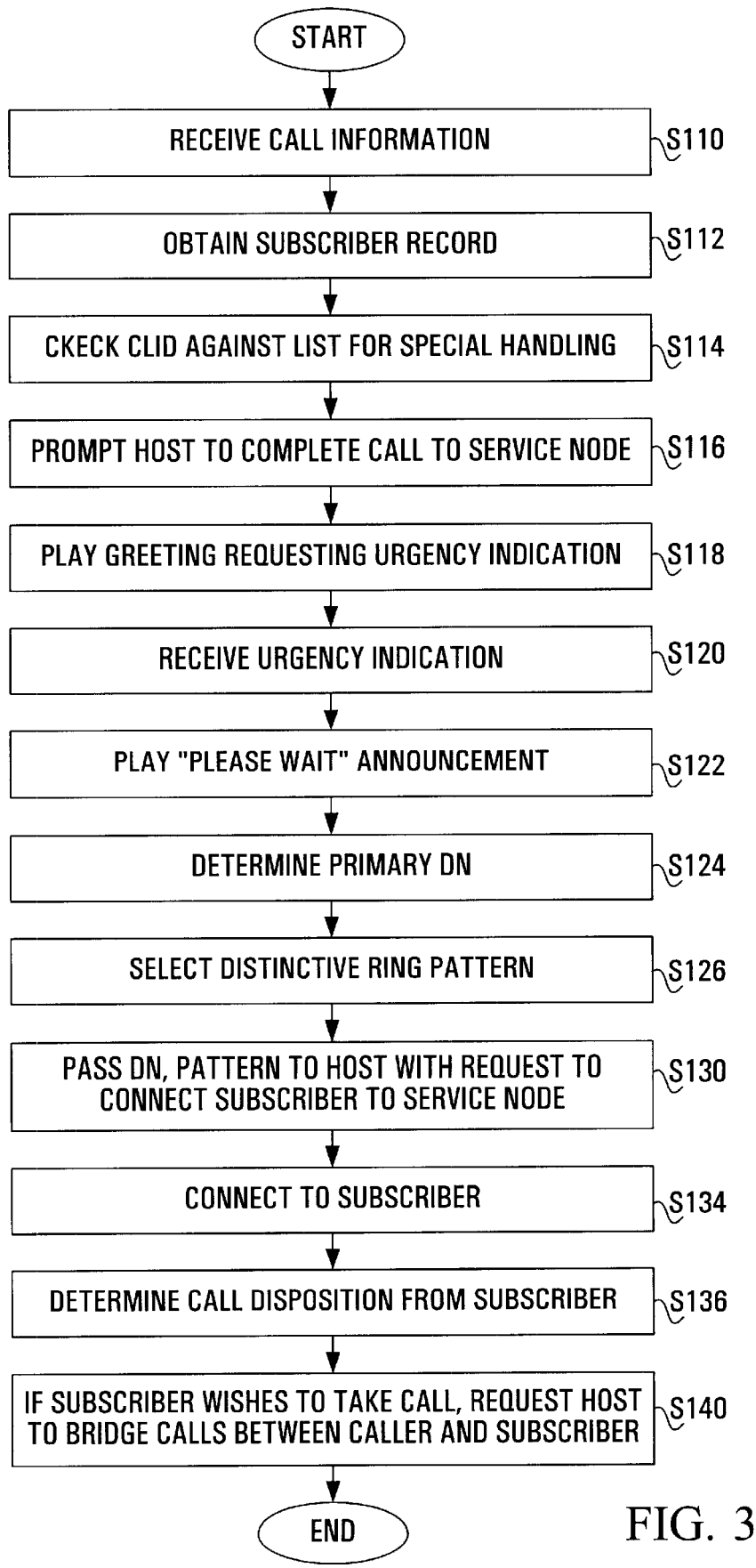
FIG. 3 is a flow diagram illustrating operation of the service node of FIG. 1.

In operation if a caller at telephone station 20 dials a PN for a subscriber to personal agent services, the call is intercepted at host node 16 and the host node sends information (the PN and CLID) in relation to the call to service node 16. Referring to FIG. 3 along with FIGS. 1 and 2, the service node, on receiving the call information (S110), uses the PN to obtain the appropriate subscriber record from database 34 (S112). The service node first checks the subscriber profile for a list of calling numbers requiring special call handling—for example, a given number in the list may indicate calls from that number are to be blocked (S114). Assuming no special call handling is required, the service node prompts the host to complete the call through to the service node (S116). The service node then plays a greeting to the caller (S118). The greeting invites the caller to indicate an urgency level for the call. (For example: "Please indicate the level of urgency of your call from 1 to 5, with 5 being an emergency.") The service node may have a digit tone recogniser permitting it to recognise dual tone multi-frequency (DTMF) tones. In such case, the greeting will invite the caller to press keys to generate DTMF tones in order to indicate urgency level. Alternatively, the service node may have an interactive voice response (IVR) unit permitting it to recognise voice input. In such case, the greeting may invite the caller to orally indicate a level of urgency. In either event, upon receiving a level of urgency indication (S120), the service node then plays an announcement inviting the caller to wait while an attempt is made to contact the subscriber (S122).

Based upon the subscriber profile, the service node determines the current primary telephone station for the subscriber and accesses the DN associated with that telephone station (S124). For example, it may be that telephone stations 22 and 24/26 are associated with the subscriber and that station 22 is currently the primary station. Next the service node correlates the received urgency indication to a distinctive ring pattern and thereby selects a distinctive ring pattern (S126). The service node then passes the DN for the primary telephone station and the selected distinctive ring pattern to the host node and requests that the host node attempt a call from the service node to the DN using the distinctive ring pattern (S130).

By way of example, the distinctive ring pattern may be a repeating pattern of three short rings followed closely by a normal ring in the case of an urgency indication of level "1". The pattern may be a repeating pattern of three short rings followed by a pause, then three short rings followed by a pause and a normal ring in the case of an urgency indication of level "2". An additional set of three short rings may be added to the pattern for each higher level of urgency.

Assuming the primary telephone station is on hook, it will ring with the distinctive ring pattern. The subscriber, on hearing the distinctive ring pattern will recognise the level of urgency ascribed to the call by the caller. This allows the subscriber to make a more informed decision as to whether to take the call. Thus, for example, where the subscriber is involved in a social interaction, on hearing a distinctive ring indicating a relatively low level of urgency, the subscriber may decide not to take the call.

If the subscriber does take the call, she is connected to her personal agent (S134). The personal agent may then provide additional information regarding the caller and allow the subscriber the choice of call disposition (S136). This conventional functionality is further described in the aforereferenced U.S. Pat. No. 5,329,578.

If the subscriber chooses to be connected through to the caller, then the service node signals the host node appropriately and the call from the caller to the service node and from the called party subscriber to the service node are bridged (S140).

If the subscriber does not take the call then the service node may access the subscriber record for a DN associated with a subsidiary telephone station. The subsidiary DN, along with the previously selected distinctive ring pattern, may then be passed to the host node requesting a call be attempted from the service node to the subsiduary DN using the distinctive ring pattern. This process may be repeated, as necessary, until the subscriber answers a telephone station or the list of telephone stations in the subscriber record is exhausted. Where the list is exhausted, or where a call to a telephone station in the list results in a busy (off hook) indication, the personal agent may arrange for the call to be completed to the voice mail DN stored in the subscriber profile.

The list of calling numbers requiring special call handling (visited at S114) may include numbers having associated default urgency indicators. For example, the profile may store the number of the subscriber's superior at work along with an associated urgency indicator of "4" to indicate a high level of urgency. Further, whenever the subscriber leaves an urgent message at a number, that number may be stored in the subscriber profile along with an associated urgency indicator of "4" and an indication that the entry should be deleted after the call is returned. For any calling number in the list, the service node could immediately look up the distinctive ring pattern which correlates with the stored urgency indication as well as the primary DN. The service node could then request the host attempt to complete the call from the caller to the called subscriber using the retrieved DN and distinctive ring pattern.

One of the telephone stations associated with a subscriber's PN may be a pager. Some pagers convert an incoming ringing signal to vibrations. Thus, the distinctive ringing sequence forwarded by the service node would be converted to a distinctive vibration sequence by such devices. Therefore, the distinctive ringing pattern stored in the subscriber profile may more generally be described is a distinctive notification pattern. Further, it may be that some of the telephone stations associated with the subscriber's PN are equipped with displays. Optionally, the subscriber profile may store a distinctive display pattern in association with each urgency level indicator as well as a distinctive ringing pattern. In such instance, when a call is to be directed to a telephone station having a display, a distinctive display pattern is sent to the telephone station along with, or in place of, a distinctive ringing pattern. For example, display patterns could cause the display of "PRIORITY", "URGENT", "VERY URGENT", "MOST URGENT", and "EMERGENCY" for calls having increasing levels of urgency.

As will be appreciated by those skilled in the art, the described system functions equally well when adapted to an advanced intelligent network (AIN). In an AIN, the host switching node would be replaced by a signal switching point (SSP) and the functionality of a service node may be shared by a service control point (SCP) and an intelligent peripheral (IP). The SCP would hold the subscriber record and provide call completion instructions and the IP would provide voice services to allow collection of the urgency indication.

Figure 4:
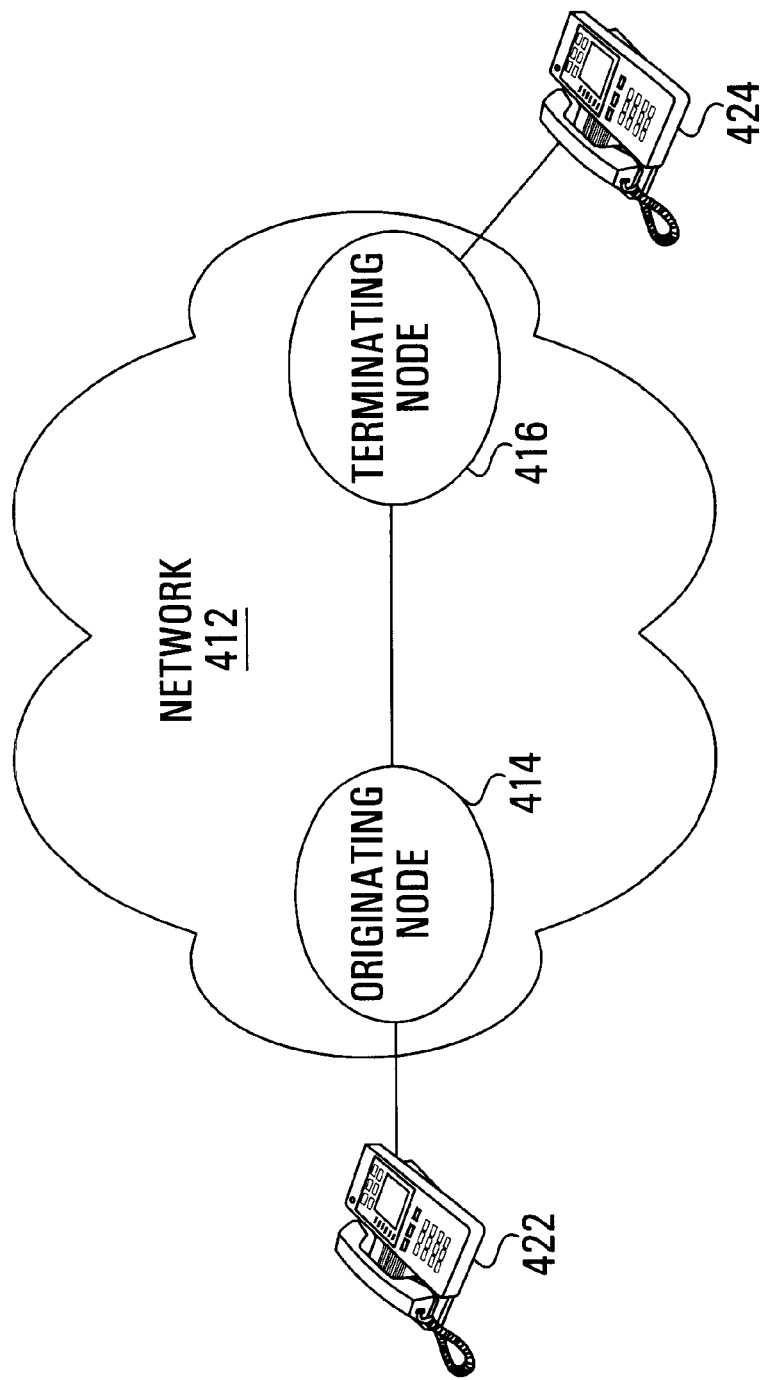
FIG. 4 is a schematic illustration of another telecommunications system made in accordance with this invention.

In another embodiment, illustrated in FIG. 4, all of the functionality for indicating urgency through distinctive ringing is held in the terminating node 416. In such case, when a DN for telephone station 424 is dialled at telephone station 422, the call is sent through network 412 from the originating node 414 to the terminating node 416. The terminating node compares the DN to a list of subscribers to the urgency feature. Assuming the particular DN matches, the terminating node queries for an urgency indication and, on receiving same, correlates the urgency indication to a distinctive ring pattern. The call is then rung through to the subscriber's telephone station 424 using the distinctive ring pattern.

In the embodiment of FIG. 4, the network 412 may be the PSTN but it may equally be another type of network, such as a mobile network, or a packet switched network. If network 412 is a packet switched network, then the nodes of the network are routers rather than switches. As will be appreciated by those skilled in the art, the packet switched network may operate under voice over Internet Protocol ("VoIP"). In this regard, it will be appreciated by those skilled in the art that the PSTN may have packet switched portions.

Some systems collect an input string from a caller which includes more than a DN. For example, the Global system for Mobile Communications—GSM—is a mobile communications network architecture which supports prefix dialling so that a caller can indicate a call type, such as fax. Such a system may be adapted to allow a caller to prefix dial a call urgency indication. This prefix would then be passed to the host node 16 of FIG. 1 (or terminating node 416 of FIG. 4) saving the need for such information to be prompted by a node.

Other modifications will be apparent to those skilled in the art and, therefore, the invention is defined in the claims.

What is claimed is:

1. A method of call handling, comprising:
   receiving an indication of urgency of a call for a subscriber, said urgency determined from urgency indicators associated with one or more calling numbers within a profile for said subscriber specifying subscriber-defined special handling for calls from said calling numbers relating to destination numbers associated with said subscriber; and
   responsive to said indication, where a station corresponding to an active destination number for said subscriber is on hook, sending signals for generating a distinctive notification indicative of said urgency.

2. The method of claim 1 wherein said urgency indicator is automatically set based on an urgency for a voice message from the subscriber to a calling number for the call.

3. The method of claim 1 wherein said distinctive notification is one or more of a distinctive ring pattern, a distinctive display pattern, and a distinctive vibration pattern.

4. The method of claim 1 wherein if said indication of urgency indicates a first level of urgency, sending signals for generating a first distinctive notification and if said indication of urgency indicates a second level of urgency, sending signals for generating a second distinctive notification different from said first distinctive notification.

5. A method of call handling, comprising:
   receiving from a calling station a calling number for a call to a called number;
   determining, based on the calling number, an urgency for the call from a set of calling numbers and associated urgency indicator, said urgency indicators either specified by a subscriber or, for at least one of the urgency indicators, automatically and at least temporarily set based on an urgency specified by said subscriber for a previous call to the respective calling number; and
   sending signals to said called station for generating a distinctive ring indicative of the urgency.

6. A service node comprising:
   means for receiving an indication of urgency of a call for a subscriber, said urgency determined from urgency indicators associated with one or more calling numbers within a profile for said subscriber specifying subscriber-defined special handling for calls from said calling numbers to destination numbers associated with said subscriber; and
   means for, responsive to said indication, where a station corresponding to an active destination number for said subscriber is on hook, sending signals for generating a distinctive notification indicative of said urgency.

7. The service node of claim 6 wherein said means for sending signals for generating a distinctive notification comprise means for sending signals for generating one or more of a distinctive ring pattern, a distinctive display pattern, and a distinctive vibration pattern.

8. A computer data signal embodied in a carrier wave comprising:
   an urgency level indicator from a set of urgency level indicators each having a corresponding distinctive notification, said urgency level indicator selected for a call to a subscriber based on a subscriber-defined profile for said subscriber specifying special handling for calls relating to destination numbers associated with said subscriber.

9. The computer data signal of claim 8 wherein each said distinctive notification comprises one or more of a distinctive ring pattern, a distinctive display pattern, and a distinctive vibration pattern.

10. A database storing a set of urgency level indicators for calls from any of a plurality of calling numbers, said urgency level indicators either specified by a subscriber or, for at least one of the plurality of urgency level indicators, automatically and at least temporarily set based on an urgency specified by said subscriber for a previous call to the respective calling number, wherein each urgency level indicator corresponds to a unique distinctive ringing pattern.

* * * * *